United States Patent
Cochrane et al.

(10) Patent No.: US 6,983,291 B1
(45) Date of Patent: Jan. 3, 2006

(54) INCREMENTAL MAINTENANCE OF AGGREGATED AND JOIN SUMMARY TABLES

(75) Inventors: Roberta Jo Cochrane, Los Gatos, CA (US); Mir Hamid Pirahesh, San Jose, CA (US); Richard Sefton Sidle, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/571,554

(22) Filed: May 16, 2000

Related U.S. Application Data

(60) Provisional application No. 60/135,277, filed on May 21, 1999.

(51) Int. Cl.
G06F 17/30 (2006.01)
(52) U.S. Cl. .................................................... 707/200
(58) Field of Classification Search .............. 707/1–10, 707/100–104.1, 200–205, 500, 509
See application file for complete search history.

(56) References Cited

U.S. PATENT DOCUMENTS

| | | | | |
|---|---|---|---|---|
| 5,377,306 A | * | 12/1994 | Broomhead et al. .......... 706/14 |
| 5,379,422 A | * | 1/1995 | Antoshenkov ................. 707/1 |
| 5,414,839 A | * | 5/1995 | Joshi ............................ 707/8 |
| 5,511,116 A | * | 4/1996 | Shastry et al. ......... 379/201.03 |
| 5,584,024 A | | 12/1996 | Shwartz ......................... 707/4 |
| 5,590,324 A | | 12/1996 | Leung et al. ................... 707/5 |
| 5,666,526 A | * | 9/1997 | Reiter et al. .................... 707/2 |
| 5,706,495 A | | 1/1998 | Chadha et al. ................. 707/2 |
| 5,761,657 A | | 6/1998 | Hoang ........................... 707/4 |
| 5,793,968 A | * | 8/1998 | Gregerson et al. .......... 709/209 |
| 5,812,840 A | | 9/1998 | Shwartz ......................... 707/4 |
| 5,822,751 A | * | 10/1998 | Gray et al. ..................... 707/3 |
| 5,835,904 A | * | 11/1998 | Vicik et al. .................... 707/1 |
| 5,870,746 A | | 2/1999 | Knutson et al. ............ 707/101 |
| 5,890,150 A | | 3/1999 | Ushijima et al. ............... 707/3 |
| 5,893,125 A | | 4/1999 | Shostak ...................... 715/511 |
| 5,918,232 A | | 6/1999 | Pouschine et al. ...... 707/103 R |
| 5,926,819 A | * | 7/1999 | Doo et al. ............... 707/104.1 |
| 6,191,797 B1 | * | 2/2001 | Politis ........................ 345/440 |
| 6,192,460 B1 | * | 2/2001 | Goleman et al. .............. 712/1 |
| 6,289,335 B1 | * | 9/2001 | Downing et al. .............. 707/3 |
| 6,298,342 B1 | * | 10/2001 | Graefe et al. .................. 707/4 |
| 6,353,828 B1 | * | 3/2002 | Ganesh et al. ................. 707/8 |
| 6,353,835 B1 | * | 3/2002 | Lieuwen ..................... 707/203 |
| 6,408,163 B1 | * | 6/2002 | Fik ........................... 455/3.01 |
| 6,449,609 B1 | * | 9/2002 | Witkowski ..................... 707/4 |

OTHER PUBLICATIONS

"Informix Guide to SQL: Tutorial", version 9.1, Copyright 1998, Informix Software, Inc., Chapt. 3.*
IBM Technical Data Bulletin, "Deriving Production Rules for Incremental View Maintenance", vol. 35, No. 1A, Jun. 1992, pp 178.

(Continued)

*Primary Examiner*—Greta Robinson
*Assistant Examiner*—Harold E. Dodds, Jr.
(74) *Attorney, Agent, or Firm*—Gates & Cooper LLP

(57) ABSTRACT

A method, apparatus, and article of manufacture for incrementally maintaining a summary table derived from a plurality of base tables in a database stored on the computer. A plurality of modifications are applied to the base tables, and the applied modifications are then propagated to the summary table. The propagated modifications include an associated tag column containing a tag value, and the tag value indicates per row of the propagated modifications how many rows are to be added to or deleted from the summary table.

87 Claims, 13 Drawing Sheets

OTHER PUBLICATIONS

J Bailey et al., "Incremental View Maintenance by Base Relation Tagging in Distributed Databases", Distributed and Parallel Databases, vol. 6, No. 3, pp. 287-309, (ABSTRACT only).

HA Kuno et al., "Augmented Inherited Multi-index Structure for Maintenance of Materialized Path Query Views", Proceedings: Sixth International Workshop on Research Issues in Data Engineering. Interoperability of Nontraditional Database Systems, IEEE Computer Soc. Press, 1996, pp. 128-137, (ABSTRACT only).

T. Griffin et al., Incremental Maintenance of Views with Duplicates, SIGMOD Record, vol. 24, No. 2, Jun. 1995, pp. 328-339, (ABSTRACT only).

A. Gupta et al., "Maintaining Views Incrementally", SIGMOD Record, vol. 22, No. 2, Jun. 1993, 157-166, (ABSTRACT only).

* cited by examiner

INCREMENTAL MAINTENANCE OF AGGREGATED AND JOIN SUMMARY TABLES

CROSS-REFERENCE TO RELATED APPLICATIONS

This application claims the benefit under 35 U.S.C §119 (e) of co-pending and commonly-assigned U.S. provisional application Ser. No. 60/135,277, entitled "INCREMENTAL MAINTENANCE OF AGGREGATED JOIN SUMMARY TABLES", filed on May 21, 1999, by Roberta J. Cochrane, Mir H. Pirahesh, and Richard S. Sidle, which application is incorporated by reference herein.

BACKGROUND OF THE INVENTION

1. Field of the Invention

This invention relates in general to database management systems performed by computers, and in particular, to the incremental maintenance of aggregated and join summary tables.

2. Description of Related Art

Computer systems incorporating an Relational DataBase Management System (RDBMS) using a Structured Query Language (SQL) interface are well known in the art. The SQL interface has evolved into a standard language for performing operations in an RDBMS and has been adopted as such by both the American National Standards Institute (ANSI) and the International Standards Organization (ISO).

One application for an RDBMS is a data warehouse. The star schema of a typical data warehouse is comprised of a small number of very large fact tables and some number of relatively small dimension tables. The complex analytical queries that are evaluated in data warehouse environments often join one or more of the fact tables together with some dimension tables to pick up dimension attributes and then aggregate the results of these joins.

A common characteristic of the data warehouse is that data from operational systems are periodically propagated to the warehouse. For example, bulk load append operations may be applied to the fact tables on a nightly basis. Old data may also be periodically purged from the fact tables via delete statements. Dimension tables are typically more static in nature and are updated less often.

The sheer volume of data in the warehouse requires that the number of fact table scans must be minimized. Automatic summary tables, which are also known as "materialized views", are commonly used in data warehouses to help achieve this goal. Result sets that can be used in the computation of multiple queries are pre-computed and materialized in tables. The queries are then rerouted (either manually by rewriting the query or automatically by sophisticated query compilers) to refer to the summary tables rather than the base fact table data.

However, summary tables must be maintained efficiently to reflect the periodic updates to the data warehouse. Given the vast amount of data involved, there is a need in the art for efficient maintenance methods for summary tables. Moreover, there is a need in the art for maintenance methods that are incremental in nature to avoid full re-computation of the queries that generated the summary tables.

SUMMARY OF THE INVENTION

To overcome the limitations in the prior art described above, and to overcome other limitations that will become apparent upon reading and understanding the present specification, the present invention discloses a method, apparatus, and article of manufacture for incrementally maintaining a summary table derived from a plurality of base tables in a database stored on the computer. A plurality of modifications are applied to the base tables, and the applied modifications are then propagated to the summary table. The propagated modifications include an associated tag column containing a tag value, and the tag value indicates per row of the propagated modifications how many rows are to be added to or deleted from the summary table.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural and functional changes may be made without departing from the scope of the present invention.

Hardware and Software Environment

Figure 1:
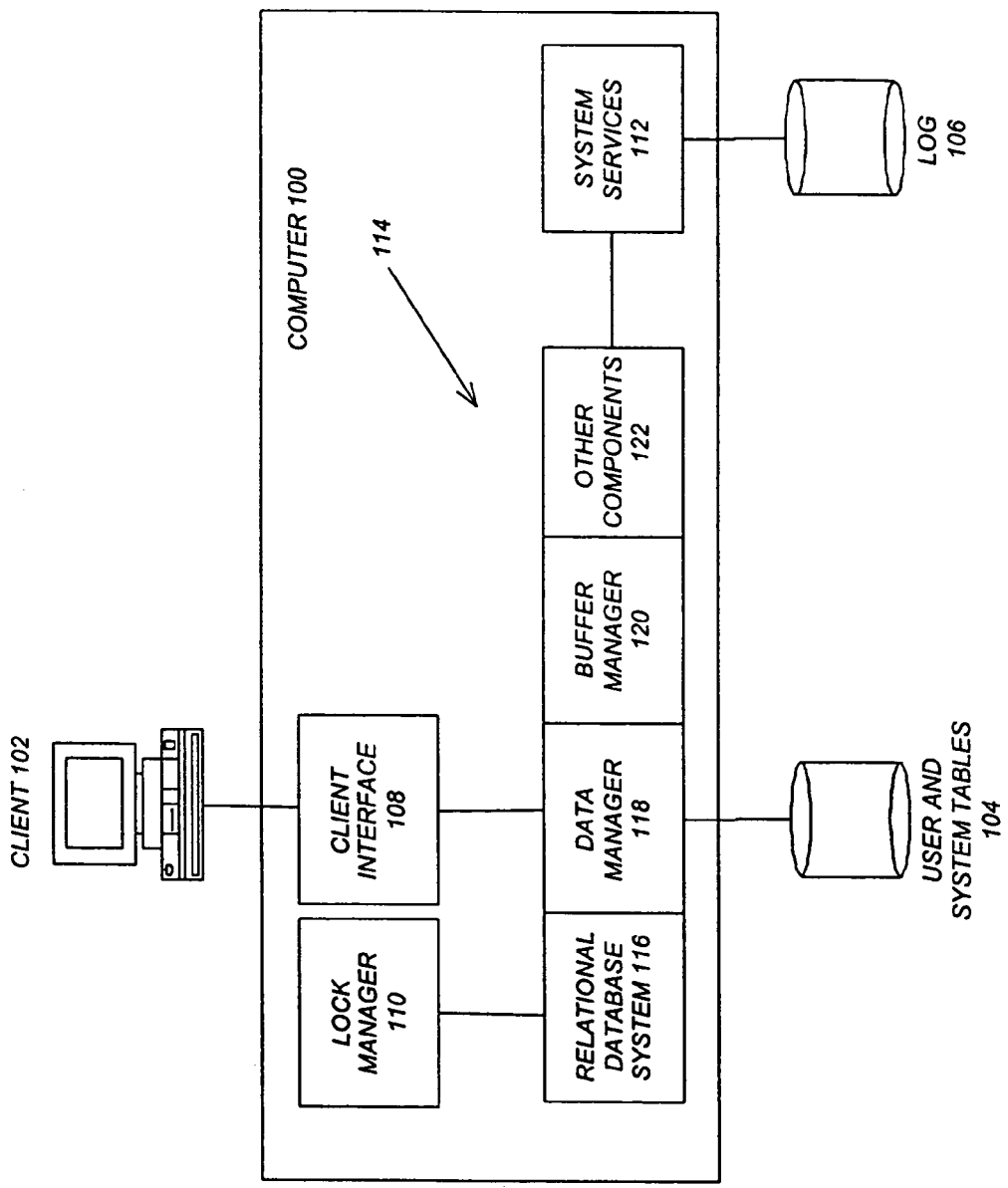
FIG. 1 illustrates an exemplary hardware and software environment that could be used with the preferred embodiment of the present invention.

FIG. 1 illustrates an exemplary hardware and software environment that could be used with the preferred embodiment of the present invention. In the exemplary environment, a server computer 100 is connected to one or more client computers 102 or terminals. The server computer 100 executes a relational database management system (RDBMS) that manages user and system tables 104 and includes a system log 106. In the preferred embodiment of the present invention, the RDBMS comprises the DataBase 2 (DB2™) Universal DataBase (UDB™) product offered by IBM Corporation, although those skilled in the art will recognize that the present invention has application to any RDBMS. The client computers 102 interface to the RDBMS via a client interface component 108.

As illustrated in FIG. 1, the RDBMS includes three major components: the Resource Lock Manager (RLM) 110, the Systems Services module 112, and the Database Services module 114. The RLM 110 handles locking services, because the RDBMS treats data as a shared resource, thereby allowing any number of users to access the same data simultaneously, and thus concurrency control is required to isolate users and to maintain data integrity. The Systems Services module 112 controls the overall RDBMS execution environment, including managing log data sets 106, gathering statistics, handling startup and shutdown, and providing management support.

At the heart of the RDBMS is the Database Services module 114. The Database Services module 114 contains several submodules, including a Relational Database System (RDS) 116, Data Manager 118, Buffer Manager 120, and Other Components 122 such as an SQL compiler/interpreter, and including an optimizer function. These submodules support the functions of the SQL language, i.e., definition, access control, retrieval, and update.

Generally, the RDBMS comprises logic and/or data that is embodied in or retrievable from a device, medium, or carrier, e.g., a fixed or removable data storage device, a remote device coupled to the computer by a data communications device, etc. Moreover, this logic and/or data, when read, executed, and/or interpreted by the computer 100, cause the computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" as used herein is intended to encompass logic and/or data embodied in or accessible from any device, carrier, or media.

Of course, those skilled in the art will recognize many modifications may be made to this configuration without departing from the scope of the present invention. For example, those skilled in the art will recognize that any combination of the above components, or any number of different components, including computer programs, peripherals, and other devices, may be used to implement the present invention, so long as similar functions are performed thereby.

Interactive SQL Execution

Figure 2:
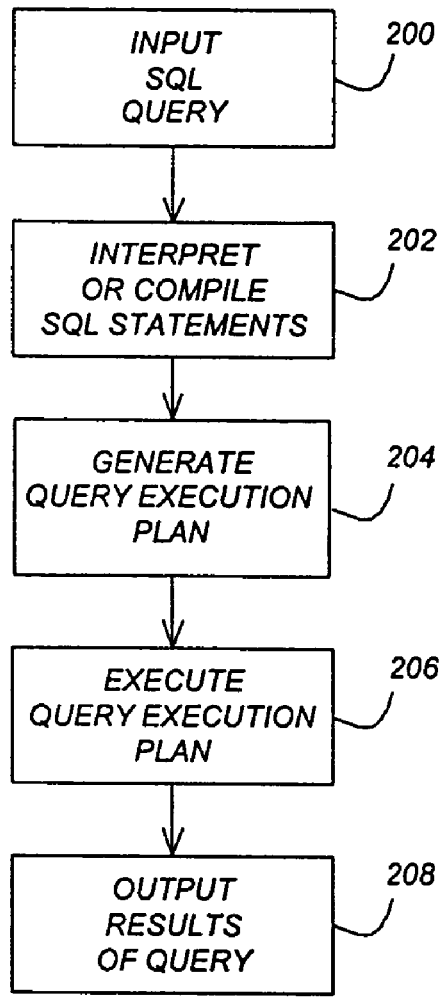
FIG. 2 is a flowchart illustrating the steps necessary for the interpretation and execution of SQL statements in an interactive environment according to the present invention.

FIG. 2 is a flowchart illustrating the steps necessary for the interpretation and execution of SQL statements in an interactive environment according to the preferred embodiment of the present invention. Block 200 represents the input of SQL statements into the computer system 102. Block 202 represents the step of compiling or interpreting the SQL statements. Block 204 represents the step of generating a compiled set of runtime structures called a query execution plan from the compiled SQL statements. An optimization function at Block 204 may transform or optimize the SQL query. Generally, the SQL statements received as input specify only the desired data, but not how to retrieve the data. This step considers both the available access paths (indexes, sequential reads, etc.) and system held statistics on the data to be accessed (the size of the table, the number of distinct values in a particular column, etc.), to choose what it considers to be the most efficient access path for the query. Block 206 represents the execution of the query execution plan and Block 208 represents the output of the results.

Embedded/Batch SQL Execution

Figure 3:
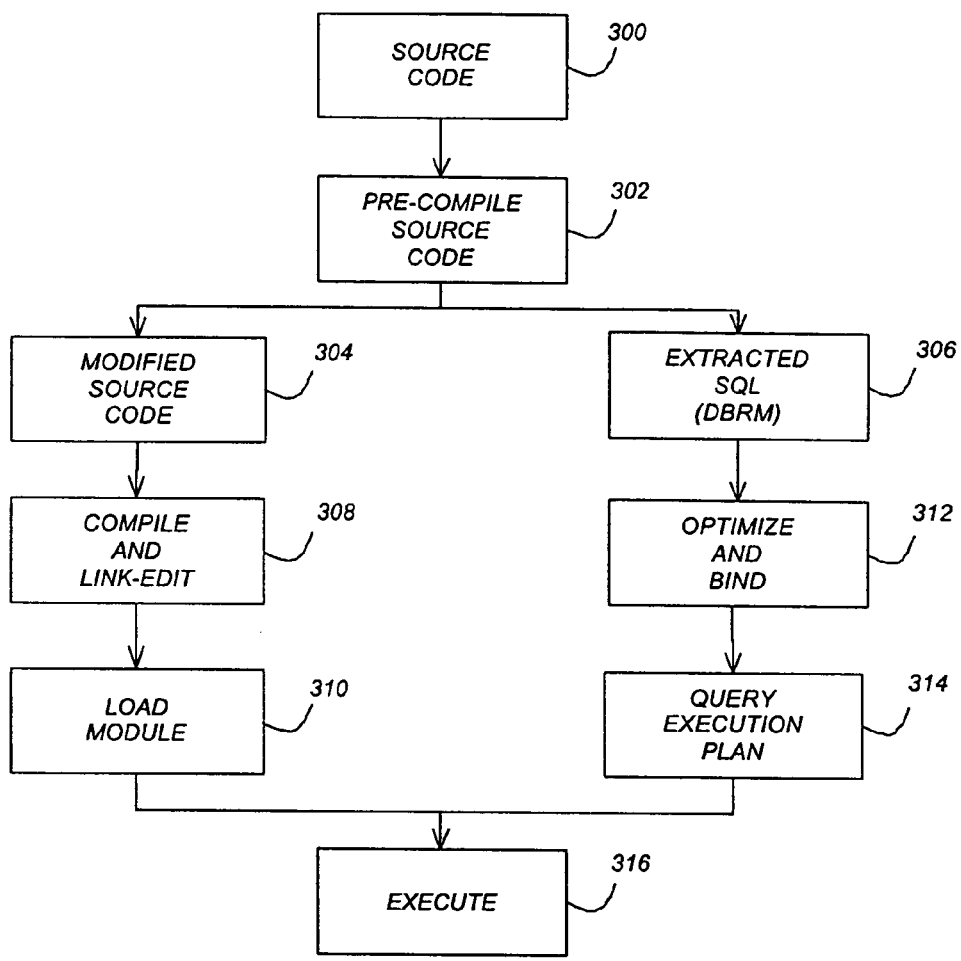
FIG. 3 is a flowchart illustrating the steps necessary for the interpretation and execution of SQL statements embedded in source code according to the preferred embodiment of the present invention.

FIG. 3 is a flowchart illustrating the steps necessary for the interpretation and execution of SQL statements embedded in source code according to the preferred embodiment of the present invention. Block 300 represents program source code containing a host language (such as COBOL or C) and embedded SQL statements. The program source code is then input to a pre-compile step 302. There are two outputs from the pre-compile step 302: a modified source module 304 and a Database Request Module (DBRM) 306. The modified source module 304 contains host language calls to the RDBMS, which the pre-compile step 302 inserts in place of SQL statements. The DBRM 306 is comprised of the SQL statements from the program source code 300. A compile and link-edit step 308 uses the modified source module 304 to produce a load module 310, while an optimize and bind step 312 uses the DBRM 306 to produce a compiled set of runtime structures for the query execution plan 314. As indicated above in conjunction with FIG. 2, the SQL statements from the program source code 300 specify only the desired data, but not how to retrieve the data. Thereafter, the optimize and bind step 312 considers both the available access paths (indexes, sequential reads, etc.) and system held statistics on the data to be accessed (the size of the table, the number of distinct values in a particular column, etc.), to choose what it considers to be the most efficient access path for the query. The load module 310 and query execution plan 314 are then executed together at step 316.

Summary Tables

For most RDBMS software, combinations of tables and views are used to access data stored in tables in the database. A view definition includes a query that, if processed, provides a temporary results table based on the results of the query at that point in time. Using an INSERT statement and an appropriately defined table in the database, the temporary results table can be stored in the database. To refresh this table, the user would need to perform a DELETE from the table and then perform the INSERT again.

Users can directly query against the created table, provided that the users are aware how the results were derived. Generally, the RDBMS is not aware that such a table is any different from any other table in the database. However, this table cannot be used by an optimizer within the RDBMS to improve performance, even though the table may contain data that would drastically improve the performance of other queries.

This leads to the notion of summary tables or materialized views as envisioned by the present invention. These tables are similar to the created table described above, except that the definition of the table is based on a "full select" (much like a view) that is materialized in the table. The columns of the table are based on the elements of the select list of the full select.

As noted above, summary tables must be maintained efficiently to reflect the periodic updates to the database. Given the vast amount of data involved, a critical feature of efficient maintenance methods is that they must be incremental in nature to avoid full re-computation of the queries that generated the summary tables. One class of summary tables that is known as "self-maintainable materialized views" may be maintained incrementally by processing only the set of updated rows without reference to the underlying tables of the query that generated the summary tables. Other summary tables can be maintained incrementally by processing the updated rows and visiting the underlying tables to re-compute some portions of the materialized view query.

Consider summary tables that satisfy the following criteria:

1. The summary table is defined as an aggregate query. That is, the query contains aggregate functions such as SUM and COUNT.
2. The FROM clause can contain inner joins or have a single table reference.
3. There is no HAVING clause.
4. The aggregate functions of the SELECT list must be "self-maintainable with respect to insertions and deletions" (as defined in the publication: I. Mimic, D. Quass, and B. Mumick, "Maintenance of Data Cubes and Summary Tables in a Warehouse", In Proceedings of ACM SIGMOD 1997 International Conference on Management of Data, 1997, pages 100–111, hereinafter referred to as [MQM97], and incorporated by reference herein), and including SUM, COUNT and AVG without DISTINCT, and they must not appear within expressions (e.g., SUM(X)*SUM(Y) is not permitted but SUM(X) is).
5. SELECT DISTINCT is not allowed.

The summary tables of this set that have a single table reference in the FROM clause are self-maintainable but the remaining summary tables of the set that contain inner joins in the FROM clause are not self-maintainable.

The present invention comprises a method to incrementally maintain the set of summary tables that is defined by the preceding criteria. Prior work (see [MQM97]) has addressed the incremental maintenance of this set of summary tables when exactly one of the underlying tables in the FROM clause has been updated. The primary difference and contribution of the present invention is that it supports incremental maintenance of this set of summary tables when one or more of the underlying tables have been updated. In fact, the present invention supports incremental maintenance for all possible updates to the set of underlying tables of such summary tables. The method of this invention can also be applied to the propagation of joins in the absence of aggregation and to the deferred incremental maintenance of joins with and without aggregation.

Incremental Maintenance

As in prior work on incremental maintenance, the present invention is comprised of two independent phases: propagate and apply. Given the update, delete and insert operations on the underlying tables of the summary table, the propagate phase computes the set of rows that must be changed in the summary tables and how each of these rows must be changed. The apply phase simply joins the set of rows to be changed with the existing contents of the summary table and then given the results of this join, makes the appropriate changes to the summary table by updating or deleting existing rows or inserting new rows. The propagate phase is where the present invention handles the changes to the underlying tables of the summary table and is thus the focus of this specification.

Assume that there are two table functions per underlying table which give the sets of deleted and inserted rows for the underlying table. Updated rows are decomposed into two rows each: a deleted row containing the old values of the columns for the updated row and an inserted row containing the new values. These table functions are referred to as $D(Ti)$ and $I(Ti)$, respectively, for i=(1, 2, . . . N) where N is the number of table references in the query of the summary table and Tj is one such table reference. The inner workings of these table functions are not of importance to this discussion, but in the example of a bulk load append operation for the table referenced by Tj, $I(Tj)$ might be implemented by a partial scan of the appended table starting at the first appended row. Note that a given table may appear multiple times in the set {T1, T2, . . . TN} and so, for example, the present invention supports joins of a table with itself.

The set of all changed rows for a given table reference Tj is the union of $D(Tj)$ and $I(Tj)$. This set is the "delta" for the table reference. The deleted and inserted rows of this delta are differentiated by adding a tag column that has value −1 for deletes and +1 for inserts. The delta for a given table reference Tj where the additional column is named "tag" can be expressed in SQL as:

SELECT DELETES.*, −1 AS TAG FROM D(Tj) AS DELETES

UNION ALL

SELECT INSERTS.*, +1 AS TAG FROM I(Tj) AS INSERTS

Each relational operation can be thought of as a table function that creates a well-defined output table from each input table. During the propagate phase, the following rules are used to derive an output delta from an input delta for the relational operations of selection, projection, union all and inner join. These rules show how to propagate the tag column values across the operation. They are fully independent of each other which enables the present invention to support incremental maintenance for any combination of these operations in a FROM clause of the materialized view query.

Rules for Selection

The predicates (if any) are applied to the columns of the input delta to select the rows that will appear in the output delta. The tag column of the output delta is derived directly from the input delta tag column. The values of the tag column are not affected by the selection operation.

Rules for Projection

The columns that are required by the projection operation are selected from the input delta to produce the output delta.

As for selection, the output delta tag column is derived directly from the input delta tag column without change to the values of this column.

Rules for Union All

Assume a general union all operation that has N operands where N>1. Some operands of the union may not have an input delta since there may be no table references in the operand or the tables referenced by the operand may not have been updated. The operands with no input delta are pruned from the union operation. If there is exactly one operand remaining (N=1), then the union operation is converted to a selection operation without predicates and the corresponding rule is applied. If N>1 after pruning, then the output delta tag column is derived directly from the tag column of the corresponding input row. The tag column values are not changed by the union all operation.

Rules for Inner Join

Assume an N-way inner join operation where M<=N of the join operands have deltas. Consider the 2-way case where both operands have input deltas (i.e. N=M=2). Given operands X and Y and the corresponding deltas named delta-X and delta-Y, then the result of the inner join operation X'><Y' can be expressed as:

$$X'><Y'=(X+delta\text{-}X)><(Y+delta\text{-}Y)= \\ X><Y+X><delta\text{-}Y+delta\text{-}X><Y+delta\text{-}X><delta\text{-}Y$$

wherein >< indicates a join operation and + is a set union (UNION ALL in SQL terms). The last three terms of this expansion provides the output delta:

$$output\text{-}delta=X><delta\text{-}Y+delta\text{-}X><Y+delta\text{-}X><delta\text{-}Y$$

X and Y are the pre-update images of the operands and are not available directly since post-update incremental maintenance is being performed. X and Y are equivalent to (X'−delta-X) and (Y'−delta-Y) respectively. Substituting for these in the above equation gives:

$$output\text{-}delta=(X'\text{-}delta\text{-}X)><delta\text{-}Y+delta\text{-}X>< \\ (Y'\text{-}delta\text{-}Y)+delta\text{-}X><delta\text{-}Y= \quad (X')<delta\text{-} \\ Y+delta\text{-}X><Y)\text{-}delta\text{-}X><delta\text{-}Y$$

wherein >< indicates a join operation, + is a set union (UNION ALL in SQL terms), and − is a set difference (EXCEPT ALL in SQL terms).

Therefore, it can be seen that the output delta for this 2-way inner join may be computed by evaluating 3 inner joins and then performing set union and set difference operations on the results of these joins. Furthermore, it can be observed that all join combinations for which the join contains at least one delta appear in this equation. In general for all M, to compute the output delta requires the evaluation $2^{}M-1$ joins. The general form of this equation is a set difference of form (A−B) where A is the result of a set union of the $2^{}(M-1)$ join terms that each contain an odd number of deltas and B is the result of a set union of the remaining $2^{**}(M-1)-1$ join terms that each contain an even number of deltas.

Note that when M<N, the non-delta operands appear unchanged in the join terms of this equation. For example, given operands X Y and Z where X and Y have deltas but Z does not (i.e. Z'=Z), then $$output\text{-}delta=(X'><delta\text{-}Y><Z'+delta\text{-}X><Y'><Z') \\ -delta\text{-}X><delta\text{-}Y><Z'$$

However, rather than computing the set difference in the general form of this equation, the tag column of each join term is computed to keep track of which rows in the output delta of the join term are deletions and which are insertions, a union all operation is injected where its operands are all of the join terms of this equation, and then the union all rule is applied to the injected operation.

The rule to calculate the tag column of a given join term that contains K<=M deltas with corresponding input tag columns input-tag$_1$, input-tag$_2$, . . . , input-tag$_K$ is:

$$input\text{-}tag_1 * input\text{-}tag_2 * \ldots input\text{-}tag_K *(K+1)$$

In summary, the inner join delta propagation rule is comprised of the following steps:

1. Generate all of the join terms. As a result of applying these rules to the input operands of the join operation, the join term that contains all M deltas already exists. To generate the remaining $2^{**}M-2$ join terms, this "all-delta" join term is copied and the input deltas are selectively replaced with the corresponding non-delta operands of the original materialized view query.
2. Add an output delta tag column to each join term using the derivation described above.
3. Inject a union operation that has the join terms as its operands and apply its delta propagation rule.

Note that this rule reduces to the simple selection rule when there is exactly one input operand (i.e. N=1) or there is only one input operand with a delta (i.e. M=1).

A set difference operation could have been used here and a corresponding rule created, but when the summary tables contain aggregation, this aggregation can be relied on to collapse the set of deleted and inserted rows for a given group and thus avoid the need to evaluate this set difference. Note that aggregation is not needed in the summary table definition to use this technique. The prior art does describe the use of a count column or a primary key for dealing with duplicates, wherein an internal aggregation is injected to maintain count duplication for joins. See, e.g., J. A. Blakeley, P. A. Larson, and F. W. Tompa, Efficiently Updating Materialized Views, Proceedings of the ACM SIGMOD International Conference on Management of Data, pages 61–71, Washington, D.C, June 1986, and Y. Zhuge, H. Garcia-Molina, J. Hammer, and J. Widom, View Maintenance in a Warehousing Environment, Proceedings of the ACM Sigmod International Conference on Management of Data, pages 316–327, San Jose, Calif., May 1995, which are incorporated by reference herein. In fact, the tag column of the present invention supports this technique as well, although it need not be restricted to only aggregation.

Although the number of join terms generated by this rule is exponential in the number of input deltas, it is unlikely that there will be a large number of deltas in practice since there are typically few fact tables and the dimension tables are rarely updated. There are opportunities to optimize the number join terms for certain types of updates. For example, if it can be guaranteed that the results of the inner join operation can contain no duplicates and that the deltas contain only inserted rows (which may be common in data warehouses due to bulk load append operations), then it is possible to create exactly M join terms each of which contains a single and different delta and then apply a distinct operation on the results of the union operation to eliminate duplicates.

These rules are used to propagate the delta and corresponding tag column from the updated referenced tables through all the relational operations of the FROM clause. The group by relational operation may now be applied to the result to compute the delta changes to the aggregate functions of the summary table. The set of grouping columns is unchanged. The tag column is used to compute the delta change to the aggregate functions as follows:

1. SUM(C) is converted to SUM(C*TAG)
2. COUNT(C) is converted to SUM(CASE WHEN C IS NULL THEN 0 ELSE TAG END)

If C is not nullable, then this can be simplified to SUM(TAG).

In order to guarantee correctness, the base table references in join expressions must be accessed using repeatable read isolation level unless there is an N to 1 relationship from the expression to the base table reference. In the latter case, concurrency can be improved by downgrading the isolation level to cursor stability.

EXAMPLE

In the example application, the computer system 100 of a credit card company stores credit card customer information, their credit card accounts, and transactions that customers made using credit cards for purchases. A possible database schema, comprising a "star" schema, is illustrated by FIG. 4 and described below:

- Table CUST contains customer information.
- Table ACCI contains credit card account information. Each customer may have one or more credit cards (i.e., one or more accounts) and a joint account may have one or more customers. Thus, the schema models M:N relationships between table CUST and table ACCT. In order to do this, an auxiliary table ACCTCUST captures the association information between accounts (ACCI) and customers (CUST).
- Table SALESPERSON contains salesperson information.
- Table LOC contains information about store locations where transactions may occur.
- Table TRANS contains transaction information. A customer may make a number of purchases using a particular credit card, and the transaction information is stored in table TRANS. Each transaction was made by a particular salesperson at a particular time and in a particular store. The salesperson, purchase time and location can be aggregated along their respective dimensions.
- Table TRANSITEM contains information about transactions on each item. In each transaction, any number of items may be purchased, and TRANSITEM stores this information and the product information can be aggregated along the product hierarchy.
- Table PRODUCT contains information about products, such as cameras, VCRs, etc.
- Table PGROUP contains product category information.
- Table PRODLINE contains information about product lines.

Figure 4:
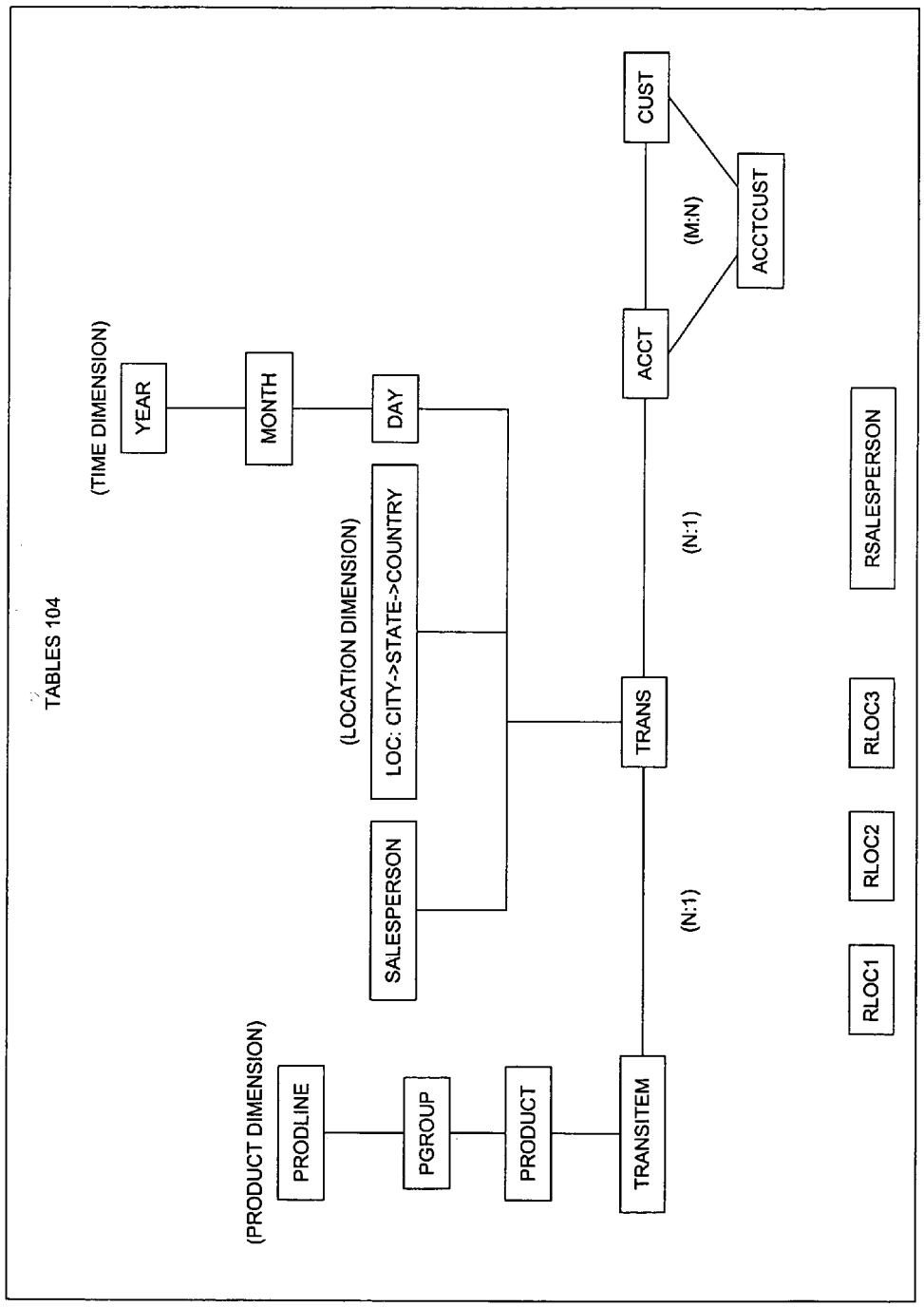
FIG. 4 is a block diagram that illustrates a "star" database schema according to the preferred embodiment of the present invention.

The following "CREATE TABLE" statements may be used to create the tables shown in FIG. 4.

```
CREATE TABLE CUST(
  ID INT NOT NULL PRIMARY KEY,
  MARITAL_STATUS CHAR(1),
  NAME VARCHAR(30),
  INCOME_RANGE INT NOT NULL,
  ZIPCODE INT,
  RESIDENCE VARCHAR(5))
  PARTITIONING KEY ID);
CREATE TABLE ACCT(
  ID INT NOT NULL PRIMARY KEY,
  CUSTID INT NOT NULL,
  CONSTRAINT CUST_ACCT FOREIGN KEY (CUSTID)
    REFERENCES CUST))
  PARTITIONING KEY (ID);
CREATE TABLE SALESPERSON(
  ID INT NOT NULL PRIMARY KEY,
  NAME VARCHAR(100),
  SALARY FLOAT,
  COMMISSION FLOAT,
  BONUS FLOAT,
  AWARD FLOAT)
  PARTITIONING KEY (ID);
CREATE TABLE LOC(
  ID INT NOT NULL PRIMARY KEY,
  CITY VARCHAR(10),
  STATE CHAR(2),
  COUNTRY VARCHAR(10)
  ADDRESS VARCHAR(200))
  PARTITIONING KEY (ID);
CREATE TABLE TRANS(
  ID INT NOT NULL PRIMARY KEY,
  ACCTID INT NOT NULL,
  PDATE DATE NOT NULL,
  STATUS VARCHAR(15),
  LOCID INT NOT NULL,
  SALESID INT NOT NULL,
  CONSTRAINT SALES_TRANS FOREIGN KEY (SALESID)
    REFERENCES SALESPERSON,
  CONSTRAINT ACCR_TRANS FOREIGN KEY (ACCTID)
    REFERENCES ACCT,
  CONSTRAINT LOC_ACCT FOREIGN KEY (LOCID)
    REFERENCES LOC)
  PARTITIONING KEY (ID);
CREATE TABLE TRANSITEM(
  ID INT NOT NULL PRIMARY KEY,
  TRANSID INT NOT NULL,
  AMOUNT DECIMAL(10,2) NOT NULL,
  PRODID INT NOT NULL,
  CONSTRAINT TRANS_TRANSITEM FOREIGN KEY
    (TRANSID) REFERENCES TRANS,
  CONSTRAINT PGROUP_TRANSITEM FOREIGN KEY
    (PRODID) REFERENCES PRODUCT)
  PARTITIONING KEY (ID);
CREATE TABLE PRODLINE(
  ID INT NOT NULL PRIMARY KEY,
  NAME VARCHAR(20))
  PARTITIONING KEY (ID);
CREATE TABLE PGROUP(
  ID INT NOT NULL PRIMARY KEY,
  NAME VARCHAR(12),
  LINEID INT NOT NULL,
  CONSTRAINT PRODLINE_PGROUP FOREIGN KEY (LINEID)
    REFERENCES PRODLINE)
  PARTITIONING KEY (ID);
CREATE TABLE PRODUCT(
  ID INT NOT NULL PRIMARY KEY,
  PROD_DESCRIPTION VARCHAR(30),
  PG_ID INT NOT NULL,
  CONSTRAINT PRODUCT_PG FOREIGN KEY (PG_ID)
    REFERENCES PGROUP)
  PARTITIONING KEY (ID);
CREATE TABLE ACCTCUST (
  ACCTID INT NOT NULL, CUSTID INT NOT NULL,
  CONSTRAINT ACCT FOREIGN KEY (ACCTID)
```

Figure 5:
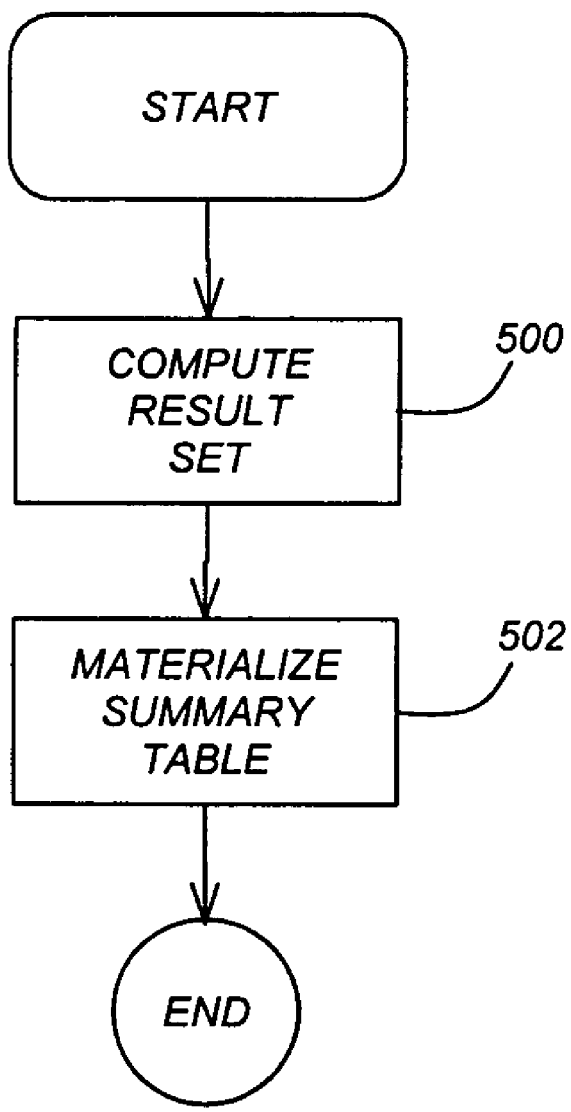
FIG. 5 is a flowchart that illustrates the logic for generating summary tables according to the preferred embodiment of the present invention.

REFERENCES ACCT,
CONSTRAINT CUST FOREIGN KEY (CUSTID)
REFERENCES CUST)
PARTITIONING KEY (ACCTID);
In this application, all tables in this database are partitioned via the partitioning keys defined above.
Given the following summary table:
CREATE SUMMARY TABLE CUST_SUMMARY1 AS
  (SELECT CUST.ID, CUST.INCOME_RANGE,
    TRANS.STATUS,
    SUM(TRANSITEM.AMOUNT) AS
      TRANS_TOTAL,
    COUNT(TRANSITEM.AMOUNT) AS
      TRANS_COUNT
  FROM CUST, ACCT, TRANS, TRANSITEM
  WHERE ACCT.CUSTID=CUST.ID AND
    TRANS.ACCTID=ACCT.ID AND
    TRANSITEM.TRANSID=TRANS.ID
  GROUP BY CUST.ID, CUST.INCOME_RANGE,
    TRANS.STATUS)
Given that the fact tables TRANS and TRANSITEM have been updated, the following is an SQL version of the result of the propagate phase of compilation:
WITH
  TRANS_DELTA(ID, ACCTID, STATUS, TAG) AS
    (SELECT TRANS_DELETES.ID,
      TRANS_DELETES.ACCTID,
      TRANS_DELETES.STATUS, -1
    FROM D CANS) AS TRANS_DELETES
    UNION ALL
    SELECT TRANS_INSERTS.ID,
      TRANS_INSERTS.ACCTID,
      TRANS_INSERTS.STATUS, +1
    FROM I(TRANS) AS TRANS_INSERTS),
  TRANSITEM_DELTA(TRANSID, AMOUNT, TAG) AS
    (SELECT TRANSITEM_DELETES.TRANSID,
      TRANSITEM_DELETES.AMOUNT, -1
    FROM D(TRANSITEM) AS
      TRANSITEM_DELETES
    UNION ALL
    SELECT TRANSITEM_INSERTS.TRANSID,
      TRANSITEM_INSERTS.AMOUNT, +1
    FROM I(TRANSITEM) AS
      TRANSITEM_INSERTS),
  JOIN1_DELTA(CUST_ID,
    CUST_INCOME_RANGE,
    TRANS_STATUS, TRANSITEM_AMOUNT,
    TAG) AS
    (SELECT CUST.ID, CUST.INCOME_RANGE,
      TRANS_DELTA.STATUS, TRANSITEM.A-
      MOUNT,
      TRANS_DELTA.TAG*(-11)**2
    FROM CUST, ACCT, TRANS_DELTA, TRANSITEM
    WHERE ACCT.CUSTID=CUST.ID AND
      TRANS_DELTA.ACCTID=ACCT.ID AND
      TRANSITEM.TRANSID=TRANS_DELTA.ID
    UNION ALL
    SELECT CUST.ID, CUST.INCOME_RANGE,
      TRANS.STATUS,
      TRANSITEM_DELTA.AMOUNT,
      TRANSITEM_DELTA.TAG*(-1)**2
    FROM CUST, ACCT, TRANS,
      TRANSITEM_DELTA
    WHERE ACCT.CUSTID=CUST.ID AND
      TRANS.ACCTID=ACCT.ID AND
      TRANSITEM_DELTA.TRANSID=TRANS.ID
    UNION ALL
    SELECT CUST.ID, CUST.INCOME_RANGE,
      TRANS_DELTA.STATUS,
      TRANSITEM_DELTA.AMOUNT,
      TRANS_DELTA.TAG*TRANSITEM_DELTA.
      TAG*
      (-1)**3
    FROM CUST, ACCT, TRANS_DELTA,
      TRANSITEM_DELTA
    WHERE ACCT.CUSTID=CUST.ID AND
      TRANS_DELTA.ACCTID=ACCT.ID AND
      TRANSITEM_DELTA.TRANSID=
      TRANS_DELTA.ID)
  SELECT CUST_ID, CUST_INCOME_RANGE,
    TRANS_STATUS, SUM
      (TRANSITEM_AMOUNT*
    TAG) AS TRANS_TOTAL, SUM(TAG) AS
    TRANS_COUNT
  FROM JOIN1_DELTA
  GROUP BY CUST_ID,
    CUST_INCOME_RANGE,
    TRANS_STATUS Logic of the Preferred Embodiment FIG. 5 is a flowchart that illustrates the logic for generating summary tables according to the preferred embodiment of the present invention. Typically, this occurs during some initialization phase, and does not occur for each subsequent access to the summary tables.

Block 500 represents the RDBMS computing a result set from at least one underlying base table in the database. In the preferred embodiment, the result set is generated using join operations with or without aggregation operations.

Block 502 represents the RDBMS materializing the computed result set in a summary table. In the preferred embodiment, the summary table satisfies the following criteria: (1) the summary table is defined as an aggregate query, (2) a FROM clause for the aggregate query contains only inner joins, (3) a FROM clause for the aggregate query contains only a single table reference, (4) the aggregate query does not contain a HAVING clause, (5) aggregate functions in a SELECT list of the query are self-maintainable with respect to insertions and deletions, and (6) a SELECT DISTINCT operation is not allowed.

Figure 6:
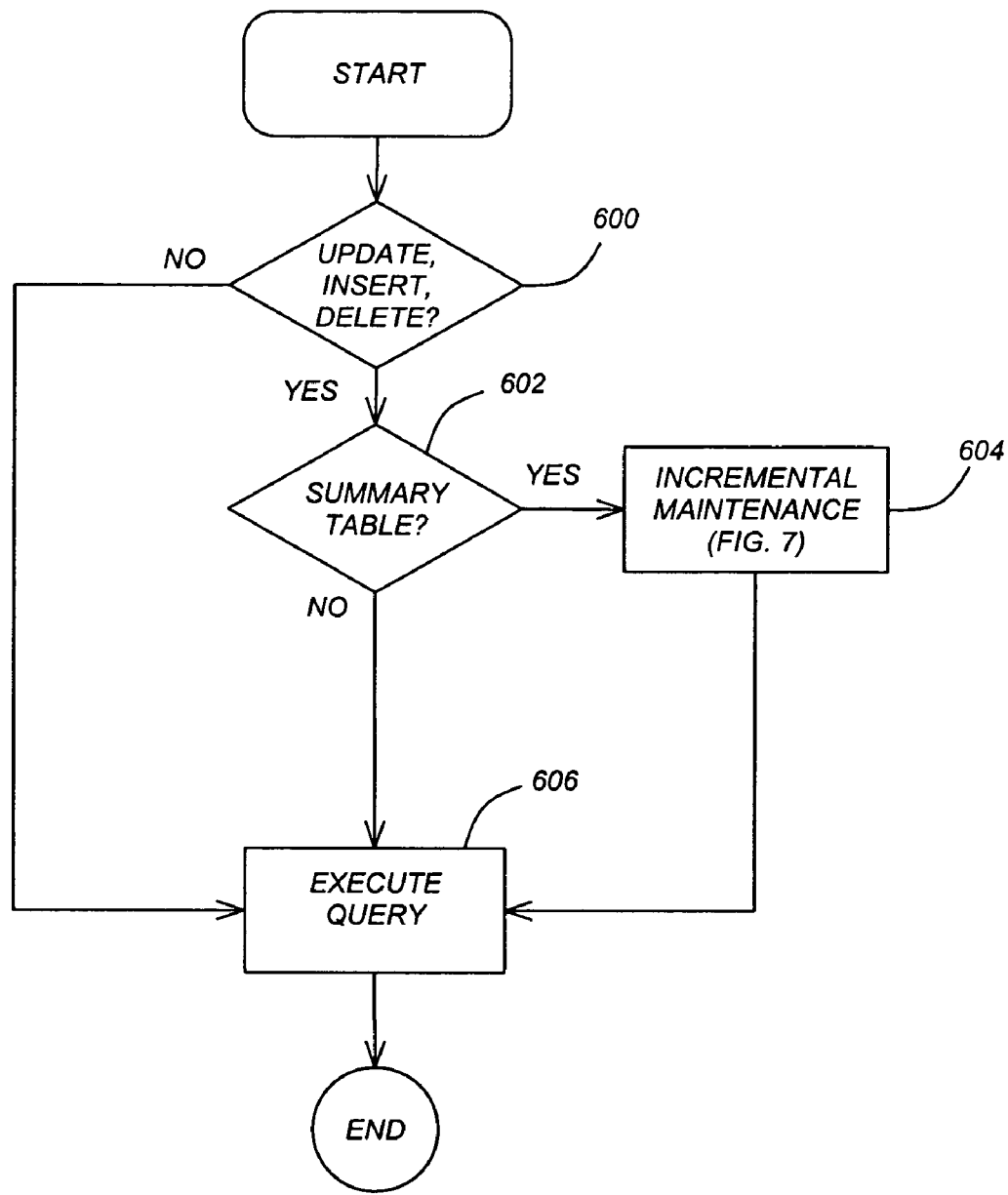
FIG. 6 is a flowchart illustrating the logic for compiling in operators for incrementally maintaining summary tables according to the preferred embodiment of the present invention.

FIG. 6 is a flowchart illustrating the additional logic for incrementally maintaining summary tables in step 204 of FIG. 2 and step 312 of FIG. 3 according to the preferred embodiment of the present invention.

Block 600 is a decision block that represents the optimizer determining whether there is one or more update, delete or insert statements in the query. If so, control transfers to Block 602; otherwise control transfers to Block 606.

Block 602 is a decision block that represents the optimizer determining whether there is one or more summary tables or materialized views referencing one or more tables modified by one of the update, insert, or delete statements in the query. If so, control transfers to Block 604; otherwise, control transfers to Block 606.

Figure 7:
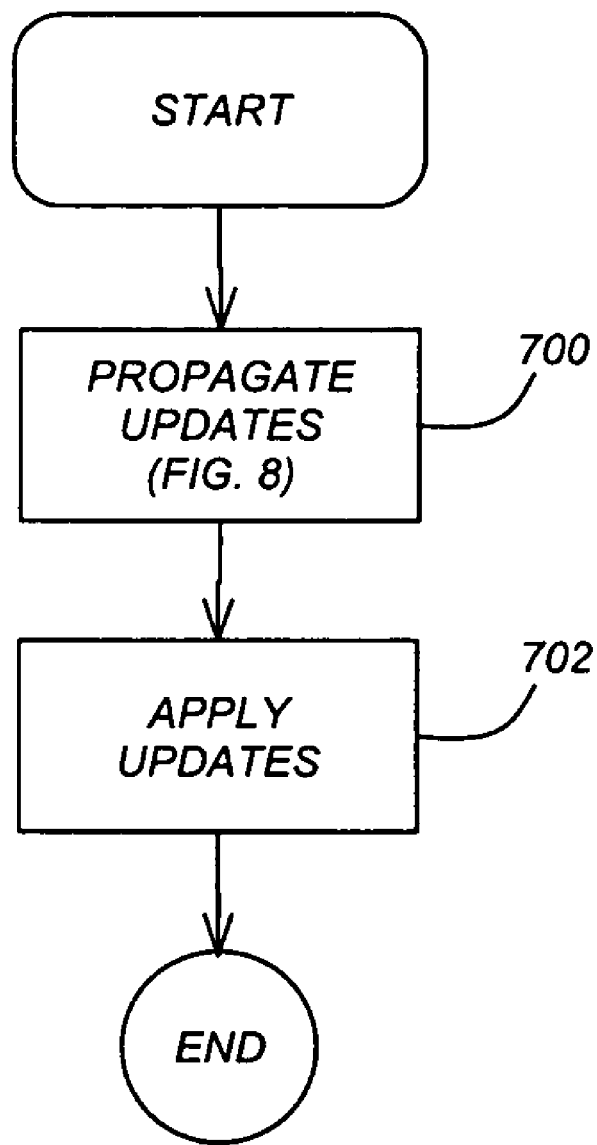
FIG. 7 is a flowchart that illustrates the logic for maintaining the summary tables according to the preferred embodiment of the present invention.

Block 604 represents the RDBMS compiling in incremental maintenance of the summary table, as further described in FIG. 7. Although this embodiment shows the incremental maintenance being performed when updates are made to the underlying base tables, those skilled in the art will recognize that the incremental maintenance could be triggered after a bulk load append, at periodic time intervals, etc. Regardless of how the incremental maintenance is triggered, the logic described herein could be used to perform the incremental maintenance.

Finally, Block 606 represents the RDBMS performing normal query optimization, building an execution plan, and executing the query.

FIG. 7 is a flowchart that illustrates the logic for maintaining the summary tables according to the preferred embodiment of the present invention. Specifically, this flowchart illustrates the logic used to maintain the summary tables in an incremental manner to reflect updates made to the underlying base table in order to avoid a full re-computation of the result set used to initially generate the result set.

Block 700 represents the RDBMS propagating the updates by computing a set of rows that must be changed in the summary table and how each of these rows must be changed. This Block is further described in FIG. 8.

Block 702 represents the RDBMS applying the updates by associating a change with a row in the summary table and then making appropriate changes to the summary table by updating existing rows, deleting existing rows, and inserting new rows.

Figure 8:
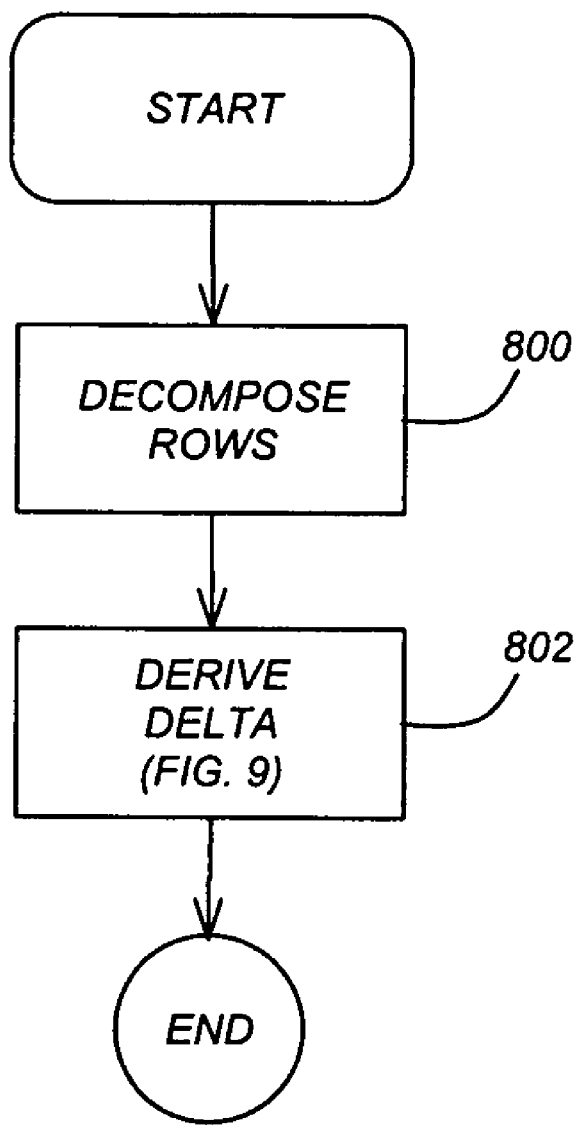
FIG. 8 is a flowchart that illustrates the logic for propagating the updates used to maintain the summary tables according to the preferred embodiment of the present invention.

FIG. 8 is a flowchart that illustrates the logic for propagating the updates used to maintain the summary tables according to the preferred embodiment of the present invention.

Block 800 represents the RDBMS decomposing each of the rows that must be changed in the summary table into a deleted row containing old values of the columns for the row and an inserted row containing new values of the columns for the row. In the case of deletes and inserts, this step only generates one row.

The underlying base tables are referred to as Ti for i=(1, 2, . . . , N, the deleted rows after decomposition are referred to as D(Ti), the inserted rows after decomposition are referred to as I(Ti), and the set of all updated rows for an underlying base table Tj is a union of D(Tj) and I(Tj). Note that each of the underlying base tables may appear multiple times in a set {T1, T2, . . . ,TN}.

The set of all updated rows for an underlying base table is referred to as a delta for the underlying base table. The deleted and inserted rows of the delta are differentiated by adding a tag column to each of the rows. In one embodiment, the tag column has a value of −1 for deleted rows and a value of +1 for inserted rows.

Block 802 represents the RDBMS deriving an output delta from an input delta for one or more relational operations used in computing the result set. This requires propagating the tag column values across each of the relational operations. This Block is further described in FIG. 9.

Figure 9:
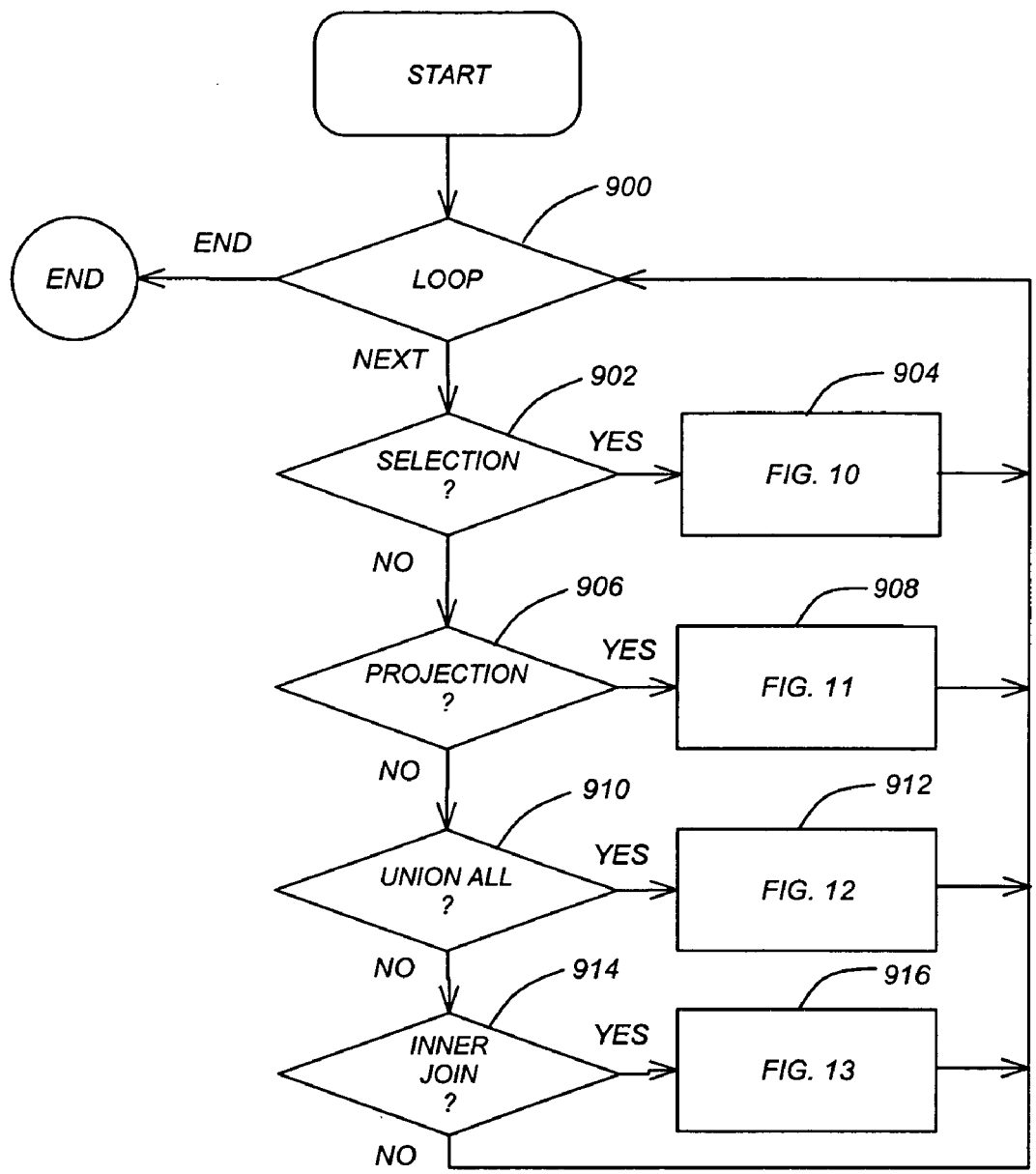
FIG. 9 is a flowchart that illustrates the logic for deriving an output delta for each of the relational operations used in computing the result set according to the preferred embodiment of the present invention.

FIG. 9 is a flowchart that illustrates the logic for deriving an output delta for each of the relational operations used in computing the result set according to the preferred embodiment of the present invention.

Block 900 is a decision block that represents the RDBMS looping through the relational operations used in computing the result. For each of the operations, control transfers to Block 902; upon completion of the loop, the logic of FIG. 9 terminates and control returns to FIG. 8.

Block 902 is a decision block that represents the RDBMS determining whether the next relational operation is a selection operation. If so, control transfers to Block 904, which represents the RDBMS performing the steps illustrated in FIG. 10 according to the preferred embodiment of the present invention; otherwise, control transfers to Block 906.

Block 906 is a decision block that represents the RDBMS determining whether the next relational operation is a projection operation. If so, control transfers to Block 908, which represents the RDBMS performing the steps illustrated in FIG. 11 according to the preferred embodiment of the present invention; otherwise, control transfers to Block 910.

Block 910 is a decision block that represents the RDBMS determining whether the next relational operation is a union all operation. If so, control transfers to Block 912, which represents the RDBMS performing the steps illustrated in FIG. 12 according to the preferred embodiment of the present invention; otherwise, control transfers to Block 914.

Block 914 is a decision block that represents the RDBMS determining whether the next relational operation is an inner join operation. If so, control transfers to Block 916, which represents the RDBMS performing the steps illustrated in FIG. 13 according to the preferred embodiment of the present invention; otherwise, control transfers to Block 900.

Figure 10:
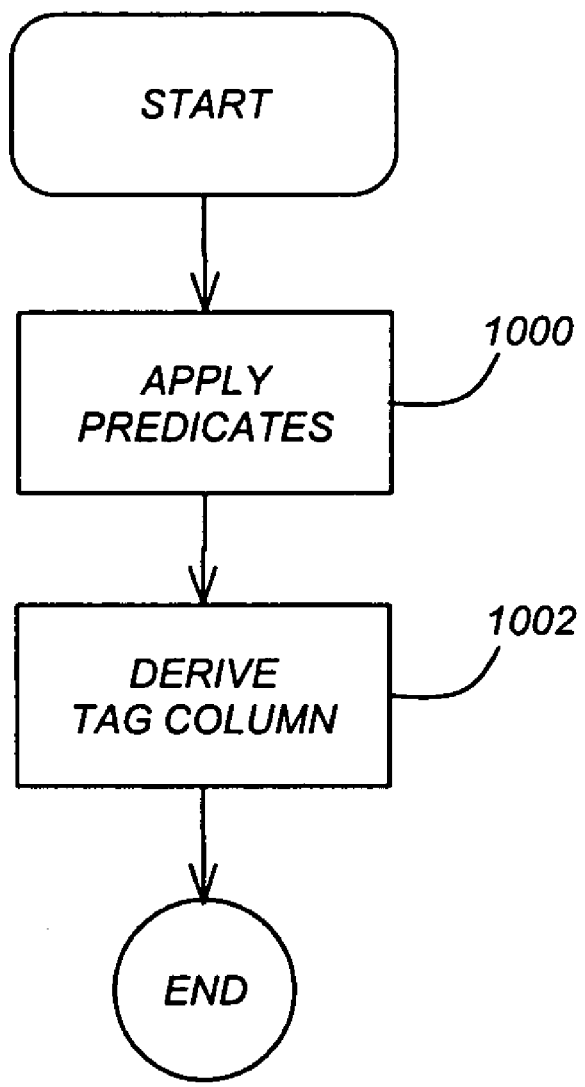
FIG. 10 is a flowchart that illustrates the logic for deriving an output delta for a selection operation used in computing the result set according to the preferred embodiment of the present invention.

FIG. 10 is a flowchart that illustrates the logic for deriving an output delta for a selection operation used in computing the result set according to the preferred embodiment of the present invention.

Block 1000 represents the RDBMS applying zero or more predicates to one or more columns of the input delta to select the rows that will appear in the output delta.

Block 1002 represents the RDBMS deriving the tag column of the output delta directly from the input delta tag column, wherein the values of the tag column are not affected by the selection operation.

Figure 11:
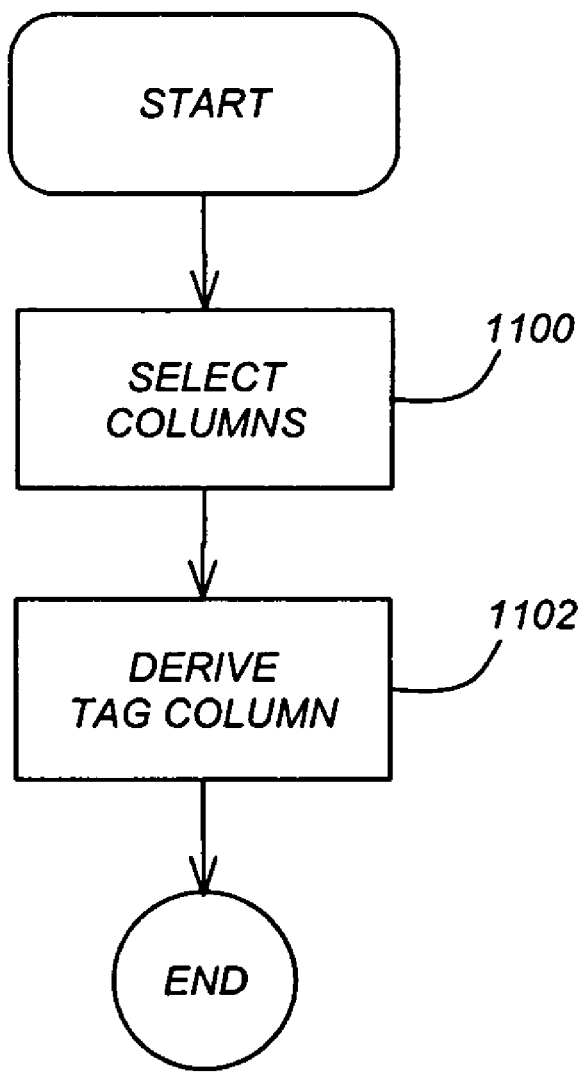
FIG. 11 is a flowchart that illustrates the logic for deriving an output delta for a projection operation used in computing the result set according to the preferred embodiment of the present invention.

FIG. 11 is a flowchart that illustrates the RDBMS deriving an output delta for a projection operation used in computing the result set according to the preferred embodiment of the present invention.

Block 1100 represents the RDBMS selecting one or more columns that are required by the projection operation from the input delta to produce the output delta.

Block 1102 represents the RDBMS deriving the output delta tag column directly from the input delta tag column without change to the values of this column.

Figure 12:
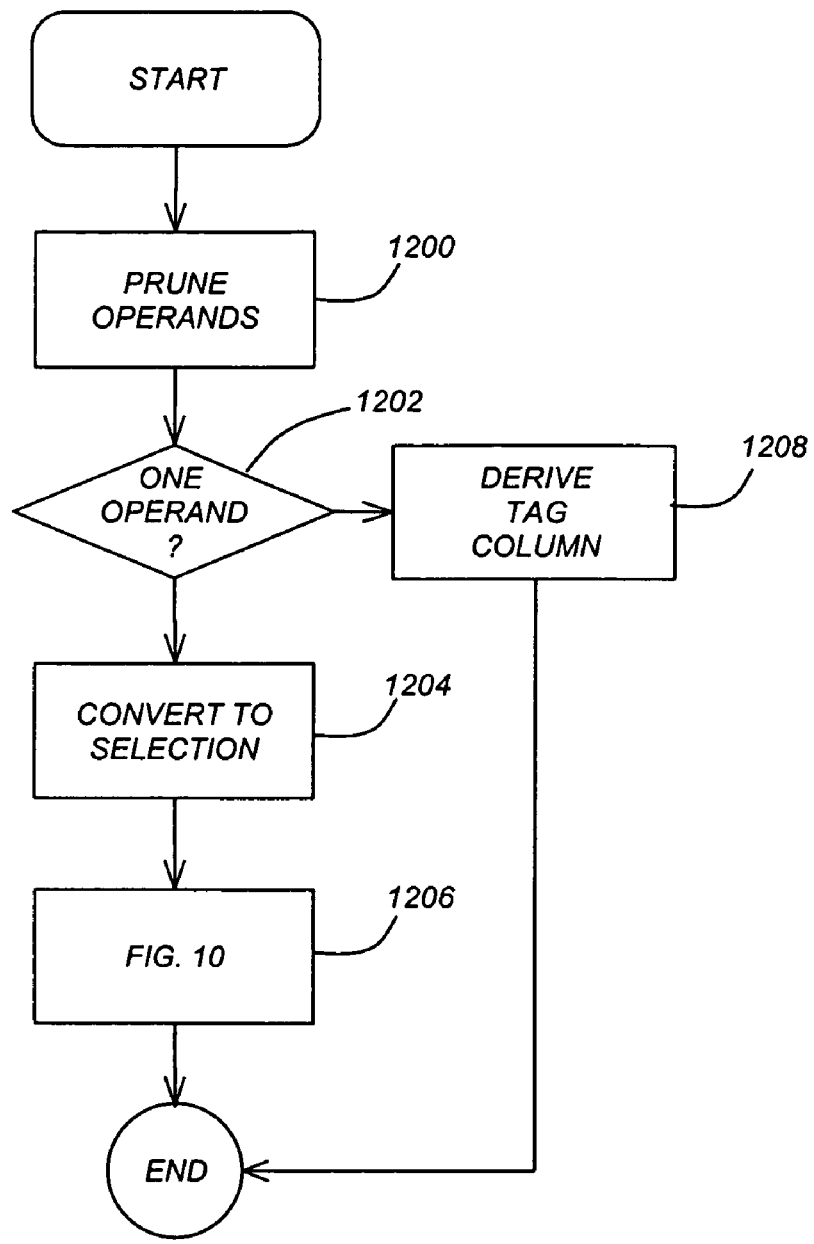
FIG. 12 is a flowchart that illustrates the logic for deriving an output delta for a union all operation used in computing the result set according to the preferred embodiment of the present invention.

FIG. 12 is a flowchart that illustrates the logic for deriving an output delta for a union all operation used in computing the result set according to the preferred embodiment of the present invention.

Block 1200 represents the RDBMS pruning operands with no input delta from the union operation. This Block may include pruning operands that reference only table functions and/or pruning operands that reference an underlying base table that has not been updated.

Block 1202 is a decision block that represents the RDBMS determining whether there is exactly one operand remaining (N=1) after pruning. If so, control transfers to Block 1204; otherwise, control transfers to Block 1208.

Block 1204 represents the RDBMS converting the union operation to a selection operation without predicates.

Block 1206 represents the RDBMS invoking the selection function of FIG. 10.

Block 1208 represents the RDBMS deriving the output delta tag column by unioning together the tag columns of the input deltas, wherein the tag column values are not changed by the union all operation.

Figure 13:
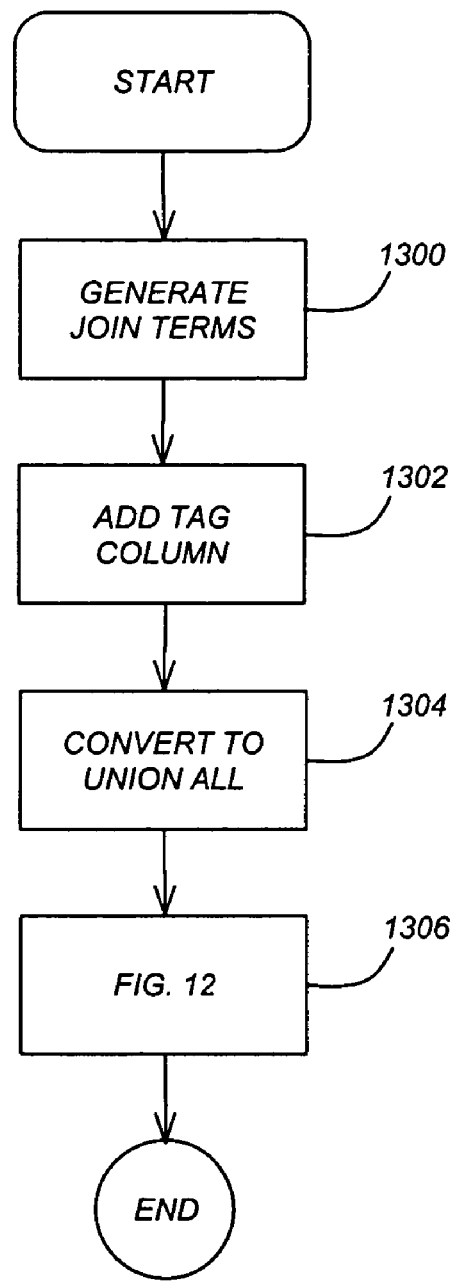
FIG. 13 is a flowchart that illustrates the logic for deriving an output delta for an inner join operation used in computing the result set according to the preferred embodiment of the present invention.

FIG. 13 is a flowchart that illustrates the logic for deriving an output delta for an inner join operation used in computing the result set according to the preferred embodiment of the present invention.

Block 1300 represents the RDBMS generating one or more join terms for the inner join operation.

Block 1302 represents the RDBMS adding an output delta tag column to each of the generated join terms.

Block 1304 represents the RDBMS converting the inner join operation into a union all operation that includes the generated join terms as its operands.

Block 1306 represents the RDBMS recursively invoking the union all function of FIG. 12.

CONCLUSION

This concludes the description of the preferred embodiment of the invention. The following describes some alternative embodiments for accomplishing the present invention. For example, any type of computer, such as a mainframe, minicomputer, or personal computer, could be used with the present invention. In addition, any software program adhering (either partially or entirely to the relational paradigm could benefit from the present invention.

In summary, the present invention discloses a method, apparatus, and article of manufacture for incrementally maintaining a summary table derived from a plurality of base tables in a database stored on the computer. A plurality of modifications are applied to the base tables, and the applied modifications are then propagated to the summary table. The propagated modifications include an associated tag column containing a tag value, and the tag value indicates per row of the propagated modifications how many rows are to be added to or deleted from the summary table.

The foregoing description of the preferred embodiment of the invention has been presented for the purposes of illustration and description. It is not intended to be exhaustive or to limit the invention to the precise form disclosed. Many modifications and variations are possible in light of the above teaching.

What is claimed is:

1. A method of incrementally maintaining a summary table derived from a plurality of base tables in a database stored on the computer, the method comprising:
    (a) applying a plurality of modifications to the base tables; and
    (b) propagating the applied modifications to the summary table, wherein the propagated modifications include an associated tag column containing a tag value, and the tag value indicates how many rows are to be added or deleted from the summary table.

2. The method of claim 1, wherein the modifications comprise deltas.

3. The method of claim 1, wherein the tag value indicates per row of the propagated modifications how many rows are to be added to or deleted from the summary table.

4. The method of claim 3, wherein a tag value equal to −n indicates that n rows are to be deleted from the summary table, and a tag value equal to +n indicates that n rows are to be inserted into the summary table.

5. The method of claim 4, further comprising initializing the tag column according to one or more of the following rules:
    if the modification is an inserted row, creating a propagated row with values from the inserted row and the tag value equal to +1,
    if the modification is a deleted row, creating a propagated row with values from the deleted row and the tag value equal to −1, and
    if the modification is an updated row, decomposing the updated row into two propagated rows, wherein a first propagated row contains old values from the updated row and the tag value equal to −1, and a second propagated row contains new values from the updated row and the tag value equal to +1.

6. The method of claim 5, wherein the base tables are referred to as Ti, the deleted rows are referred to as D(Ti), the inserted rows are referred to as I(Ti), and i=(1, 2, . . . , N).

7. The method of claim 6, wherein each of the base tables may appear multiple times in a set {T1, T2, . . . , TN}.

8. The method of claim 6, wherein a set of all updated rows for a base table Tj is a union of D(Tj) and I(Tj).

9. The method of claim 8, wherein the set results front a plurality of modifications to the base table.

10. The method of claim 9, wherein the set comprises a delta for the base table.

11. The method of claim 10, wherein the propagating step comprises deriving an output delta from an input delta for one or more relational operations used in generating the summary table.

12. The method of claim 11, further comprising propagating the tag values across the relational operation.

13. The method of claim 12, wherein the relational operation comprises a selection operation and the propagating step comprises:
    applying zero ox more predicates to one or mote columns of the input delta to select the rows that will appear in the output delta; and
    deriving the tag column of the output delta directly from the input delta tag column, wherein the tag values are not affected by the selection operation.

14. The method of claim 12 wherein the relational operation comprises a projection operation and the propagating step comprises:
    selecting one or more columns that are required by the projection operation from the input delta to produce the output delta, and
    deriving the output delta tag column directly from the input delta tag column without change to the tag values.

15. The method of claim 12, wherein the relational operation comprises a union all operation and the propagating step comprises:
    pruning operands with no input delta from the union all operation,
    if there is exactly one operand remaining (N=1) after pruning, then converting the union all operation to a selection operation without predicates, applying zero or more predicates to one or more columns of the input delta to select the rows that will appear in the output delta, and deriving the tag column of the output delta directly from the input delta tag column, wherein the tag values are not affected by the selection operation; and
    if there is more than one operand remaining (N>1) after pruning, then deriving the output delta tag column by unioning together the tag columns of the input deltas, wherein the tag values are not changed by the union all operation.

16. The method of claim 15, wherein the pruning step comprises pruning operands that reference to a table function.

17. The method of claim 15, wherein the pruning step comprises pruning operands that reference a base table that has not been updated.

18. The method of claim 12, wherein the relational operation comprises an inner join operation and the propagating step comprises:
    generating one or mote join terms for the inner join operation, adding an output delta tag column to each of the generated join terms, and injecting a union operation that includes the generated join terms as its operands into the propagating step, and then applying the following steps:

pruning operands with no input delta from the union operation, if there is exactly one operand remaining (N=1) after pruning, then converting the union operation to a selection operation without predicates, applying zero or more predicates to one or more columns of the input delta to select the rows that will appear in the output delta, and deriving the tag column of the output delta directly from the input delta tag column, wherein the tag values are not affected by the selection operation; and if there is more than one operand remaining (N>1) after pruning, then deriving the output delta tag column with the following rule: for a given join term that contains K<=M deltas with corresponding input tag columns input-tag$_1$, input-tag$_2$, ..., input-tag$_K$:

output delta tag=input-tag$_1$*input-tag$_2$* ... *input-tag$_K$*(−1)**(K+1).

19. The method of claim 18, further comprising using repeatable read to access base table references in at least one join expression, unless there is an N-to-1 relationship from the join expression to the base table reference.

20. The method of claim 18, further comprising using cursor stability to access base table references in at least one join expression, when there is an N-to-1 relationship from the join expression to the base table reference.

21. The method of claim 1, further comprising computing a result set from at least one of the base tables and materializing the result set in the summary table.

22. The method of claim 21, wherein the result set is an aggregated result set.

23. The method of claim 21, wherein the result set is generated using join operations in the absence or presence of aggregation operations.

24. The method of claim 21, wherein the result set is generated using union all operations with or without join operations in the presence of aggregation operations.

25. The method of claim 1, wherein the summary table is a self-maintainable materialized view and the propagating step further comprises maintaining the summary table in an incremental manner by processing only a set of updated rows without reference to the base tables.

26. The method of claim 1, wherein the summary table satisfies one or more of the following criteria:

(1) the summary table is defined as an aggregate query, (2) a FROM clause for the aggregate query contains only inner joins, (3) a FROM clause for the aggregate query contains only a single table reference, (4) the aggregate query does not contain a HAVING clause, (5) aggregate functions in a SELECT list of the query are self-maintainable with respect to insertions and deletions, and (6) a SELECT DISTINCT operation is not allowed.

27. The method of claim 1, wherein the summary table has a single table reference in a FROM clause and thus is self-maintainable.

28. The method of claim 1, wherein the summary table that contains ner joins in a FROM clause and is not self-maintainable.

29. The method of claim 1, wherein the propagated modifications are performed on after images of the modified base tables.

30. A computer-implemented apparatus for incrementally maintaining a summary table derived from a plurality of base tables in a database stored on the computer, comprising:

(a) logic, performed by the computer, for:

(1) applying a plurality of modifications to the base tables; and (2) propagating the applied modifications to the summary table, wherein the propagated modifications include an associated tag column containing a tag value, and the tag value indicates how many rows are to be added or deleted from the summary table.

31. The apparatus of claim 30, wherein the modifications comprise deltas.

32. The apparatus of claim 30, wherein the tag value indicates per row of the propagated modifications how many rows are to be added to or deleted from the summary table.

33. The apparatus of claim 32, wherein a tag value equal to −n indicates that n rows are to be deleted from the summary table, and a tag value equal to +n indicates that n rows are to be inserted into the summary table.

34. The apparatus of claim 33, further comprising logic for initializing the tag column according to one or more of the following rules:

if the modification is an inserted row, creating a propagated row with values from the inserted tow and the tag value equal to +1, if the modification is a deleted row, creating a propagated row with values from the deleted row and the tag value equal to −1, and if the modification is an updated row, decomposing the updated row into two propagated rows, wherein a first propagated row contains old values from the updated tow and the tag value equal to −1, and a second propagated row contains new values from the updated row and the tag value equal to +1.

35. The apparatus of claim 34, wherein the base tables are referred to as Ti, the deleted rows are referred to as D(Ti), the inserted rows are referred to as I(Ti), and i=(1, 2, ..., N).

36. The apparatus of claim 35, wherein each of the base tables may appear multiple times in a set {T1, T2, ..., TN}.

37. The apparatus of claim 35, wherein a set of all updated rows for a base table Tj is a union of D(Tj) and I(Tj).

38. The apparatus of claim 37, wherein the set results from a plurality of modifications to the base table.

39. The apparatus of claim 37, wherein the set comprises a delta for the base table.

40. The apparatus of claim 39, wherein the logic for propagating comprises logic for deriving an output delta from an input delta for one or more relational operations used in generating the summary table.

41. The apparatus of claim 40, further comprising logic for propagating the tag values across the relational operation.

42. The apparatus of claim 41, wherein the relational operation comprises a selection operation and the logic for propagating comprises logic for:

applying zero or more predicates to one or more columns of the input delta to select the rows that will appear in the output delta; and deriving the tag column of the output delta directly from the input delta tag column, wherein the tag values are not affected by the selection operation.

43. The apparatus of claim 41, wherein the relational operation comprises a projection operation and the logic for propagating comprises logic for:
  selecting one or more columns that are required by the projection operation from the input delta to produce the output delta, and
  deriving the output delta tag column directly from the input delta tag column without change to the tag values.

44. The apparatus of claim 41, wherein the relational operation comprises a union all operation and the logic for propagating comprises logic for:
  pruning operands with no input delta from the union all operation,
  if there is exactly one operand remaining (N=1) after pruning, then converting the union all operation to a selection operation without predicates, applying zero or mote predicates to one or more columns of the input delta to select the tows that will appear in the output delta, and deriving the tag column of the output delta directly from the input delta tag column, wherein the rag values are not affected by the selection operation; and
  if there is more than one operand remaining (N>1) after pruning, then deriving the output delta tag column by unioning together the tag columns of the input deltas, wherein the tag values are not changed by the union all operation.

45. The apparatus of claim 44, wherein the logic for pruning comprises logic for pruning operands that reference to a table function.

46. The apparatus of claim 44, wherein the logic for pruning comprises logic for pruning operands that reference a base table that has not been updated.

47. The apparatus of claim 41, wherein the relational operation comprises an inner join operation and the logic for propagating comprises logic for:
  generating one or more join terms for the inner join operation,
  adding an output delta tag column to each of the generated join terms, and
  injecting a union operation tag includes the generated join terms as its operands into the propagating step, and then applying the following steps:
  pruning operands with no input delta from the union operation,
  if there is exactly one operand remaining (N=1) after pruning, then converting the union operation to a selection operation without predicates, applying zero or more predicates to one or more columns of the input delta to select the rows that will appear in the output delta, and deriving the tag column of the output delta directly from the input delta tag column, wherein the tag values are not affected by the selection operation; and
  if there is mote than one operand remaining (N>1) after pruning, then deriving the output delta tag column with the following rule: for a given join term that contains K<=M deltas with corresponding input tag columns input-tag$_1$, input-tag$_2$, . . . , input-tag$_K$:
  output delta tag=input-tag$_1$*input-tag$_2$* . . . *input-tag$_K$* $(-1)^{**}(K+1)$.

48. The apparatus of claim 47, further comprising logic for using repeatable read to access base table references in at least one join expression, unless there is an N-to-1 relationship from the join expression to the base table reference.

49. The apparatus of claim 47, further comprising logic for using cursor stability to access base table references in at least one join expression, when there is an N-to-1 relationship from the join expression to the base table reference.

50. The apparatus of claim 30, further comprising logic for computing a result set from at least one of the base tables and materializing the result set in the summary table.

51. The apparatus of claim 50, wherein the result set is an aggregated result set.

52. The apparatus of claim 50, wherein the result set is generated using join operations in the absence or presence of aggregation operations.

53. The apparatus of claim 50, wherein the result set is generated using union all operations with or without join operations in the presence of aggregation operations.

54. The apparatus of claim 30, wherein the summary table is a self-maintainable materialized view and the logic for propagating further comprises logic for maintaining the summary table in an incremental manner by processing only a set of updated rows without reference to the base tables.

55. The apparatus of claim 30, wherein the summary table satisfies one or more of the following criteria:
  (1) the summary table is defied as an aggregate query,
  (2) a FROM clause for the aggregate query contains only inner joins,
  (3) a FROM clause for the aggregate query contains only a single table reference,
  (4) the aggregate query does not contain a HAVING clause,
  (5) aggregate functions in a SECT list of the query are self-maintainable with respect to insertions and deletions, and
  (6) a SELECT DISTINCT operation is not allowed.

56. The apparatus of claim 30, wherein the summary table has a single table reference in a FROM clause and thus is self-maintainable.

57. The apparatus of claim 30, wherein the summary table that contains inner joins in a FROM clause and is nor self-maintainable.

58. The apparatus of claim 30, wherein the propagated modifications are performed on after images of the modified base tables.

59. An article of manufacture embodying logic for performing a method of incrementally maintaining a summary table derived from a plurality of base tables in a database stored on the computer, the method comprising:
  (a) applying a plurality of modifications to the base tables; and
  (b) propagating the applied modifications to the summary table, wherein the propagated modifications include an associated tag column contain a tag value, and the tag value indicates how many rows are to be added or deleted from the summary table.

60. The article of manufacture of claim 59, wherein the modifications comprise deltas.

61. The article of manufacture of claim 59, wherein the tag value indicates per row of the propagated modifications how many tows are to be added to or deleted from the summary table.

62. The article of manufacture of claim 61, wherein a tag value equal to −n indicates that n rows are to be deleted from the summary table, and a tag value equal to +n indicates that n rows are to be inserted into the summary table.

63. The article of manufacture of claim 62, further comprising initializing the tag column according to one or more of the following rules:

if the modification is an inserted row, creating a propagated row with values from the inserted row and the tag value equal to +1, if the modification is a deleted row, creating a propagated row with values from the deleted row and the tag value equal to −1, and if the modification is an updated row, decomposing the updated row into two propagated rows, wherein a first propagated row contains old values from the updated tow and the tag value equal to −1, and a second propagated row contains new values from the updated row and the tag value equal to +1.

64. The article of manufacture of claim 63, wherein the base tables are referred to as Ti, the deleted rows are referred to as D(Ti), the inserted rows are referred to as I(Ti), and i=(1, 2, . . . , N).

65. The article of manufacture of claim 64, wherein each of the base tables may appear multiple times in a set {T1, T2, . . . , TN}.

66. The article of manufacture of claim 64, wherein a set of all updated rows for a base table Tj is a union of D(Tj) and I(Tj).

67. The article of manufacture of claim 66, wherein the set results from a plurality of modifications to the base table.

68. The article of manufacture of claim 66, wherein the set comprises a delta for the base table.

69. The article of manufacture of claim 68, wherein the propagating step comprises deriving an output delta from an input delta for one or more relationship operations used in generating the summary table.

70. The article of manufacture of claim 69, further comprising propagating the tag values across the relational operation.

71. The article of manufacture of claim 70, wherein the relational operation comprises a selection operation and the propagating step comprises:

applying zero or more predicates to one or more columns of the input delta to select the rows that will appear in the output delta; and deriving the tag column of the output delta directly from the input delta tag column, wherein the tag values are not affected by the selection operation.

72. The article of manufacture of claim 70, wherein the relational operation comprises a projection operation and the propagating step comprises;

selecting one or more columns that are required by the projection operation from the input delta to produce the output delta, and deriving the output delta tag column directly from the input delta tag column without change to the tag values.

73. The article of manufacture of claim 70, wherein the relational operation comprises a union all operation and the propagating step comprises:

pruning operands with no input delta from the union all operation, if there is exactly one operand remaining (N=1) after pruning, then converting the union all operation to a selection operation without predicates, applying zero or more predicates to one or more columns of the input delta to select the rows that will appear in the output delta, and deriving the tag column of the output delta directly from the input delta tag column, wherein the tag values are not affected by the selection operation; and if there is more than one operand remaining (N>1) after pruning, then deriving the output delta tag column by unioning together the tag columns of the input deltas, wherein the tag values are not changed by the union all operation.

74. The article of manufacture of claim 73, wherein the pruning step comprises pruning operands that reference to a table function.

75. The article of manufacture of claim 73, wherein the pruning step comprises pruning operands that reference a base table that has not been updated.

76. The article of manufacture of claim 70, wherein the relational operation comprises an inner join operation and the propagating step comprises:

generating one or more join terms for the inner join operation, adding an output delta tag column to each of the generated join terms, and injecting a union operation that includes the generated join terms as its operands into the propagating step, and then applying the following steps:

pruning operands with no input delta from the union operation, if there is exactly one operand remaining (N=1) after pruning, then converting the union operation to a selection operation without predicates, applying zero or more predicates to one or more columns of the input delta to select the rows that will appear in the output delta, and deriving the tag column of the output delta directly from the input delta tag column, wherein the tag values are not affected by the selection operation; and if there is more than one operand remaining (N>1) after pruning, then deriving the output delta tag column with the following rule: for a given join term that contains K<=M deltas with corresponding input tag columns input-tag$_1$, input-tag$_2$, . . . , input-tag$_K$:

out delta tag=input-tag$_1$*input-tag$_2$* . . . *input-tag$_K$*(−1)**(+1).

77. The article of manufacture of claim 76, further comprising using repeatable read to access base table references in at least one join expression, unless there is an N-to-1 relationship from the join expression to the base table reference.

78. The article of manufacture of claim 76, further comprising using cursor stability to access base table references in at least one join expression, when there is an N-to-1 relationship from die join expression to the base table reference.

79. The article of manufacture of claim 59, further comprising computing a result set from at least one of the base tables and materializing the result set in the summary table.

80. The article of manufacture of claim 79, wherein the result set is an aggregated result set.

81. The article of manufacture of claim 79, wherein the result set is generated using join operations in the absence or presence of aggregation operations.

82. The article of manufacture of claim 79, wherein the result set is generated using union all operations with or without join operations in the presence of aggregation operations.

83. The article of manufacture of claim 59, wherein the summary table is a self-maintainable materialized view and the propagating step further comprises maintaining the summary table in an incremental manner by processing only a set of updated rows without reference to the base tables.

84. The article of manufacture of claim 59, wherein the summary table satisfies one or more of the following criteria:

(1) the summary table is defined as an aggregate query, (2) a FROM clause for the aggregate query contains only inner joins, (3) a FROM clause for the aggregate query contains only a single table reference, (4) the aggregate query does not contain a HAVING clause, (5) aggregate functions in a SELECT list of the query are self-maintainable with respect to insertions and deletions, and (6) a SELECT DISTINCT operation is not allowed.

85. The article of manufacture of claim 59, wherein the summary table has a single table reference in a FROM clause and thus is self-maintainable.

86. The article of manufacture of claim 59, wherein the summary table that contains inner joins in a FROM clause and is not self-maintainable.

87. The article of manufacture of claim 59, wherein the propagated modifications are performed on after images of the modified base tables.

* * * * *

UNITED STATES PATENT AND TRADEMARK OFFICE
CERTIFICATE OF CORRECTION

PATENT NO. : 6,983,291 B1
APPLICATION NO. : 09/571554
DATED : January 3, 2006
INVENTOR(S) : Roberta Jo Cochrane et al.

It is certified that error appears in the above-identified patent and that said Letters Patent is hereby corrected as shown below:

Column 16, line 11, for claim 9, "front" should read --from--.
Column 16, line 24, for claim 13, "mote" should read --more--.
Column 16, line 66, for claim 18, "mote" should read --more--.
Column 17, line 66, for claim 28, "ner" should read --inner--
Column 18, line 36, for claim 34, "tow" should read --row--.
Column 19, line 17, for claim 44, "mote" should read --more--.
Column 19, line 21, for claim 44, "rag" should read --tag--.
Column 20, line 23, for claim 55, "defied" should read --defined--.
Column 20, line 30, for claim 55, "SECT" should read --SELECT--.
Column 20, line 38, for claim 57, "nor" should read --not--.
Column 20, line 51, for claim 59, "contain" should read --containing--.
Column 20, line 58, for claim 61, "tows" should read --rows--.
Column 21, line 10, for claim 63, "tow" should read --row--.
Column 21, line 29, for claim 69, "relationship" should read --relational--.
Column 22, line 51, for claim 78, "die" should read --the--.

Signed and Sealed this

Twenty-sixth Day of September, 2006

JON W. DUDAS
*Director of the United States Patent and Trademark Office*